United States Patent [19]
Cox

[11] Patent Number: 5,460,348
[45] Date of Patent: Oct. 24, 1995

[54] LEG SUPPORT ASSEMBLY

[75] Inventor: Howard W. Cox, Phoenix, Ariz.

[73] Assignee: Mission Marketing Corporation, Phoenix, Ariz.

[21] Appl. No.: 181,823

[22] Filed: Jan. 18, 1994

[51] Int. Cl.⁶ .................................................... F16M 1/00
[52] U.S. Cl. ........................... 248/638; 248/237; 248/635
[58] Field of Search .................................. 248/638, 676, 248/237, 635, 148, 188.2, 188.8; 62/304; 52/39; 182/111

[56] References Cited

U.S. PATENT DOCUMENTS

| | | | |
|---|---|---|---|
| 2,882,810 | 4/1959 | Goettl | 248/237 X |
| 4,286,777 | 9/1981 | Brown | 248/635 X |
| 4,819,448 | 4/1989 | Campell | 62/304 |
| 4,856,745 | 8/1989 | Mabie | 182/45 X |
| 4,989,826 | 2/1991 | Johnston | 52/39 X |
| 5,067,685 | 11/1991 | Johnston | 248/676 |
| 5,335,893 | 8/1994 | Opp | 248/635 |

*Primary Examiner*—J. Franklin Foss
*Attorney, Agent, or Firm*—LaValle D. Ptak

[57] ABSTRACT

A leg assembly for leveling a device, such as an evaporative cooler or refrigeration unit, on a pitched roof, includes an elongated leg member having first and second ends and first and second perpendicular sides for attachment to the device to be leveled. A foot having an "L" shaped configuration has a base for placement on the roof; and an upright portion which is attached to the leg member. The leg member has a series of equally spaced holes extending along the length of at least one of the sides; and that side is located in a plane which is the plane of the pitch of the roof. The upright portion of the foot member is attached to the lower end of the leg member through a resilient vibration isolation damper. In some installations, a second vibration isolation damper is placed between the leg and the device to be supported, to act both as a spacer and as a vibration isolation member, to reduce the amount of vibrations transmitted to the roof.

10 Claims, 2 Drawing Sheets

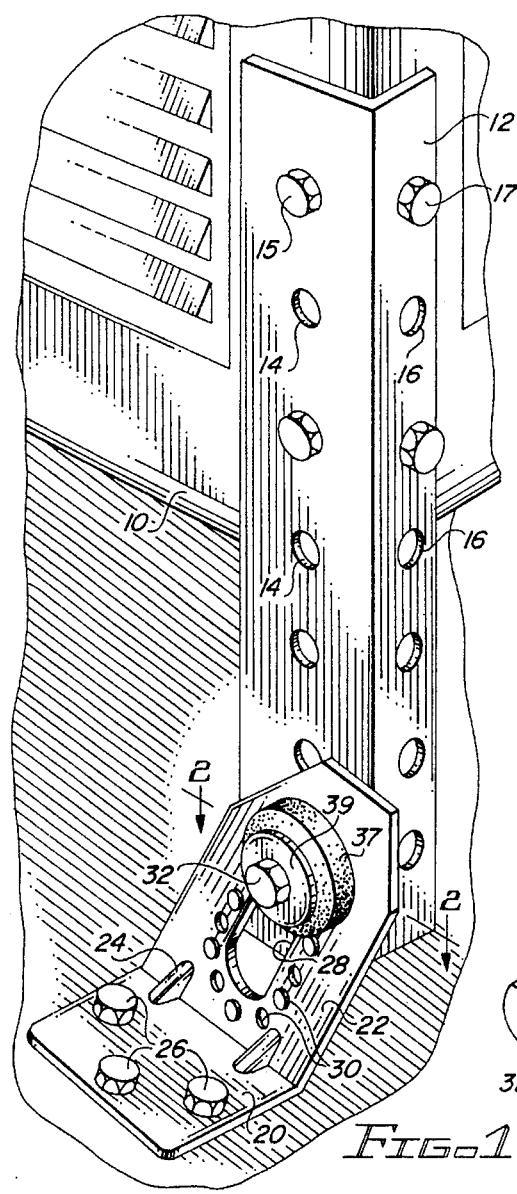
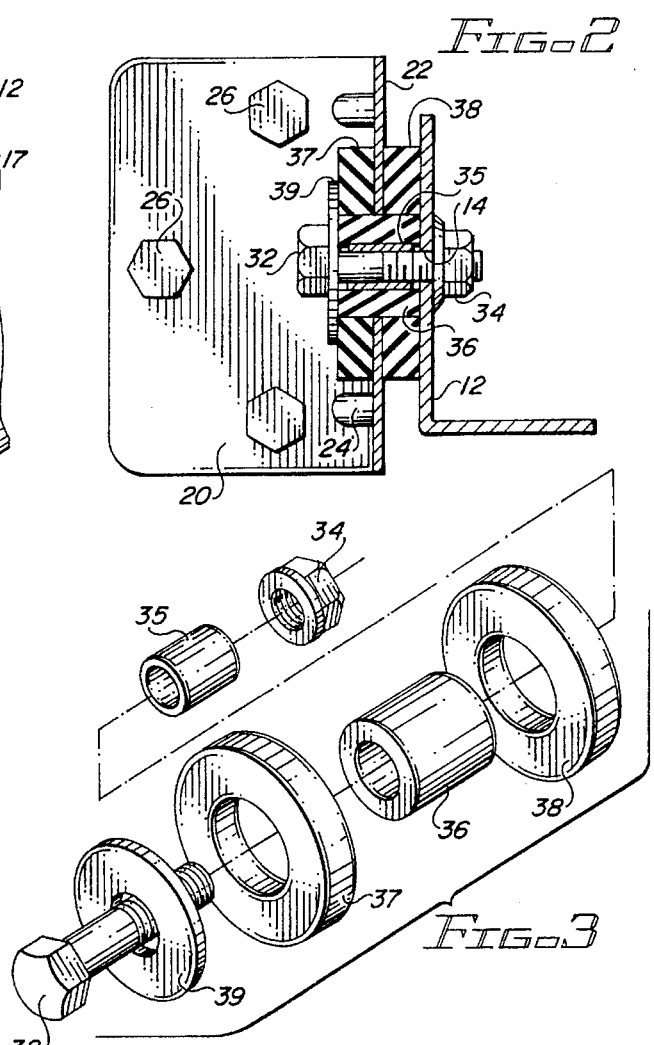
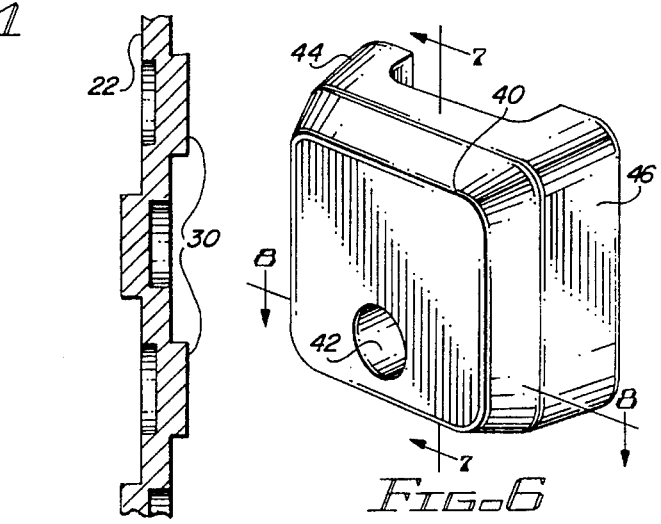
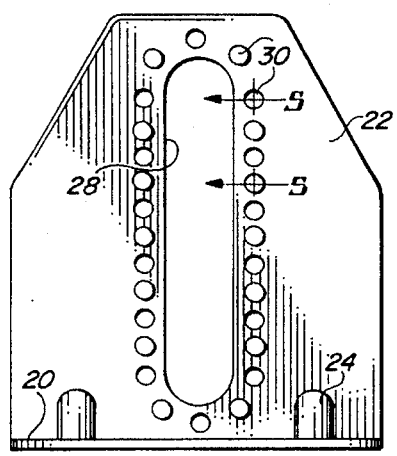

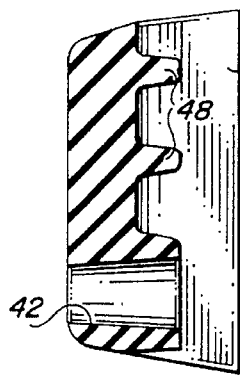
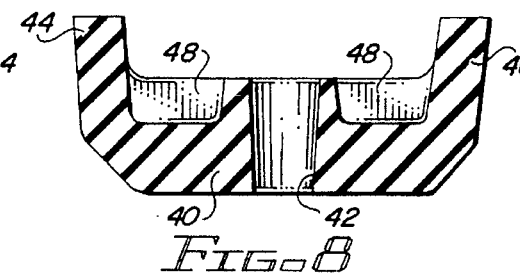
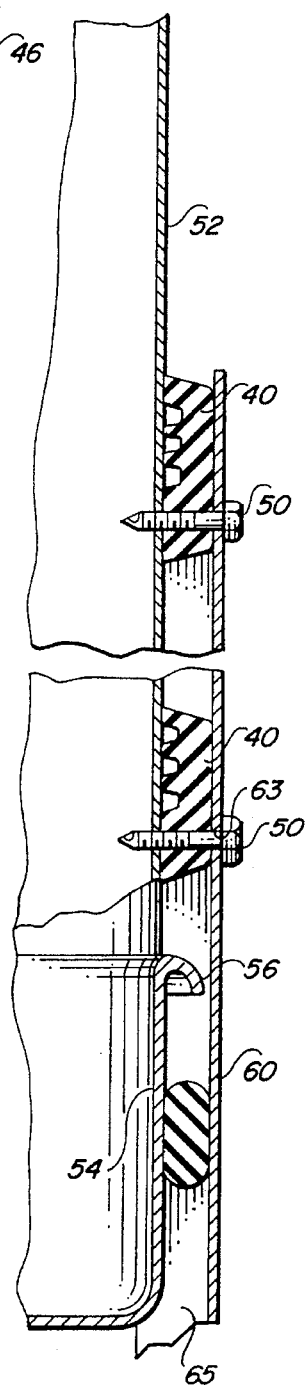
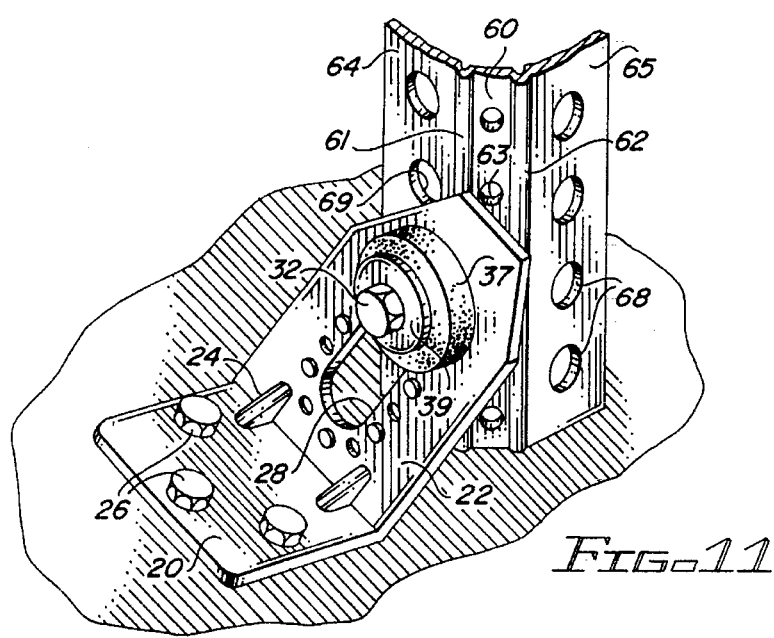

5,460,348

LEG SUPPORT ASSEMBLY

BACKGROUND

Air handling units, in the form of evaporative coolers, heat pumps and refrigeration units, frequently are installed on the roofs of commercial buildings and houses. Installations on the roofs of houses, in particular, often are made on pitched roofs. The air handler units, however, must be installed horizontally; so that the installation requires legs or extensions to support the air handler unit on the roof, and which also, accommodate for the pitch of the roof.

In the past, such installations have been made in the form of a pair of short legs placed on the "uphill" side of the roof, and a pair of long legs placed on the "downhill" side of the roof to support the four corners of the air handler unit. The legs typically are in the form of elongated "L" shaped steel plates, which fit around the corners of the air handler unit, and which have a series of holes through them. Self-tapping screws are inserted through the holes in the legs into the corner frames of the air handling unit to attach the legs to the unit. At the lower ends, "L" shaped feet are attached, and are allowed to pivot to accommodate the angle of the pitch on the roof. Once the air handler unit is installed in a horizontal position, the feet are secured to the bottom of the legs; and then the extending portions of the feet are attached to the roof.

For air handling units which are of a rectangular configuration with square corners, the foregoing installation is generally satisfactory; although the vibration from the air handler unit is transmitted through the metal legs and feet to the roof, causing noise at various levels to be heard within the building on which the unit is mounted.

Some currently manufactured evaporative coolers and other air handler units have rounded corners on them which preclude the use of the "L" shaped cross section or right-angle legs from being readily installed. For such units, the support legs have a pair of side portions interconnected by a flat central portion, which then is placed in contact with the rounded corner and attached by means of self-tapping screws, in the same manner described above. The plane of this portion of the device, however, does not follow the pitch of the roof, but is at a diagonal to that pitch. When the foot of the support assembly is attached to the bottom of the leg, it does not lie flat on the roof (or, if it is flat on the roof, it does not lie flat against the leg). As a consequence, the attachment of a foot to a leg which is oriented in this manner does not provide the desired wide area of support by the foot which is attained by devices having "square" or right-angle corners to permit the foot to pivot in a plane of the pitch of the roof.

It is desirable to provide an improved leg/foot assembly for supporting air handlers and other devices on a pitched roof, which overcomes the disadvantages of the prior art noted above, which is easy to install, effective in operation, and which isolates vibrations between the device supported on the legs and the roof.

SUMMARY OF THE INVENTION

It is an object of this invention to provide an improved leg assembly for mounting devices on pitched roofs.

It is another object of this invention to provide an improved leg assembly for isolating vibrations between a roof and a device mounted on the roof.

It is a further object of this invention to provide an improved leg and foot assembly for effecting the level mounting of air handling devices on pitched roofs.

In accordance with a preferred embodiment of the invention, an assembly for leveling a device, such as an air handler, on a pitched roof includes elongated leg members attached to the four corners of the device to be mounted. The leg members each have first and second perpendicular sides, which extend the length thereof, and which are connected at a first or upper end to the device to be supported. One side of the support leg is located in a plane of the pitch of the roof. A foot member is constructed in an "L" shaped configuration, with mutually perpendicular base and upright portions. The upright portion of the foot member is attached through a vibration isolation damper to the lower or second end of the side of the leg member which is located in the plane of the pitch of the roof.

BRIEF DESCRIPTION OF THE DRAWING

FIG. 1 is a perspective view of an installation using a preferred embodiment of the invention;

FIG. 2 is a cross-sectional view taken along the line 2—2 of FIG. 1;

FIG. 3 is an exploded view of a portion of the assembly used in the embodiment of FIGS. 1 and 2;

FIG. 4 is a side view of a portion of the embodiment shown in FIGS. 1 and 2;

FIG. 5 is an enlarged detail of the portion shown in lines 5—5 of FIG. 4;

FIG. 6 is a front perspective view of a component of another embodiment of the invention;

FIG. 7 is a cross-sectional view taken along the line 7—7 of FIG. 6;

FIG. 8 is a cross-sectional view taken along the line 8—8 of FIG. 6;

FIG. 9 is a top view illustrating an installation using the part shown in FIGS. 6 through 8;

FIG. 10 is a cross-sectional side view of the installation shown in FIG. 9; and

FIG. 11 is a perspective view of another portion of the assembly shown in FIGS. 9 and 10.

DETAILED DESCRIPTION

Reference now should be made to the drawings, in which the same reference numbers are used throughout the different figures to designate the same components. FIG. 1 illustrates one corner of an air handler unit 10 of the type used for evaporative coolers, refrigeration units, or heat pumps to be mounted on a pitched roof. The air handler unit 10 must be mounted horizontally; so that it needs to be supported by shorter legs on the "uphill" portion of the roof and longer legs on the "downhill" portion of the roof, in order to effect the horizontal mounting. The embodiment of FIG. 1 is designed to accomplish this for a unit which has square or right-angle corners.

In FIG. 1 only one corner of the device 10 is shown. It should be noted, however, that all of the other corners of the device 10 are mounted on the roof in the same manner as the corner illustrated in FIG. 1. To effect the mounting, a vertical leg in the form of an elongated "L" shaped steel member 12, having first and second mutually perpendicular sides, is fitted against the corner of the air handler 10. The first one of these sides has a series of equally spaced holes 14 vertically arranged in a line throughout its length. The other side has a similar series of equally spaced holes 16 in it.

To attach and level the unit 10 on the roof, an L-shaped foot member having a base portion 20 and an upright portion 22 is attached to the bottom of the side of the leg 12, which is located in the plane of the pitch of the roof. The foot member has an elongated vertical slot 28 in the upright portion 22; and the base portion 20 is placed on the roof of the building on which the unit 10 is to be mounted. Reinforcement between the mutually perpendicular base portion 20 and upright portion 22 is provided by a pair of spaced triangular fillets 24, as illustrated most clearly in FIGS. 1, 2 and 4.

In the installation, the base portion 20 is placed on the roof, as described, and one of the holes 14, located near the bottom end of the leg 12, is aligned with the slot 28. A bolt 32 then is used to attach the foot member to the bottom of the leg 12. In order to isolate vibrations and noise produced in the unit 10 from the roof of the building, the bolt 32 passes through an inner metal sleeve 35, which is inserted into a hollow cylindrical rubber-like vibration isolation damper 36. The outer diameter of the vibration isolation damper 36 is substantially equal to the width of the elongated slot 28; so that the bolt 32 is centered in the slot 28, as illustrated in the cross-sectional view of FIG. 2. A pair of resilient rubber-like washers 37 and 38 are placed on opposite sides of the upright portion 22 of the foot member; and a lock washer 39 is placed between the head of the bolt 32 and the resilient washer 37, as illustrated in FIGS. 2 and 3. The bolt 32 is passed through all of the washers 37, 38 and 39, the cylindrical damper 36, and through one of the holes 14 in the leg 12, where it is secured in place by a nut 34, as illustrated in FIG. 2. In the installation of the unit, the bolt 32 initially is loosely held in place on the lower end of the leg 12.

With the foot member in place on the lower end of the leg 12, as illustrated in FIG. 1, the leg is fitted over the corner of the device 10, and self-tapping screws 15 and 17 are inserted through the respective holes 14 and 16 on the two flat sides of the leg 12 to secure the leg to the device 10, which is placed in its horizontal orientation prior to the attachment of the self-tapping screws 15 and 17. Once the leg is secured to the device 10, the final pressing of the base portion 20 of the foot member against the roof is effected. The bolt 32 then is tightened against the nut 34 to securely hold the foot member on the leg 12 in its angular orientation, as illustrated in FIG. 1. Self-tapping screws or bolts 26 then are used to attach the base portion 20 of the foot member to the roof of the building. This is done for all four corners of the installation.

To reduce the potential for relative rotation between the upper portion 22 of the foot member and the lower end of the leg 12, alternating recesses and projections 30 are formed about the periphery of the slot 28 in the upper portion 22 of the foot member. These recesses and projections 30 are pressed into the facing surfaces of the resilient rubber-like washers 37 and 38 to help prevent turning of the washers and bolt 32 once the nut 34 is securely tightened onto the end of the bolt 32. It should be noted that the resilient washer and sleeve assembly 36, 37 and 38 completely isolates the bolt 32 from the upper portion 22 of the foot member, while permitting a strong, secure interconnection between the lower end of the leg 12 and the upper portion 22 of the foot member.

The metal sleeve 14, which is placed inside the resilient cylindrical damper 36, is shorter in length than the damper 36 to permit compression of the resilient damper 36 when the nut 34 is tightened onto the bolt 32. The metal sleeve 35 functions to protect the interior of the resilient damper 36 from tearing or damage by the threads on the end of the bolt 32.

Reference now should be made to FIGS. 6 through 11, which illustrate an alternative embodiment of the invention. As noted in the Background portion of this specification, some evaporative coolers and other air handler devices do not have right-angle or square corners, but instead, employ rounded corners in their construction. In addition, such air handlers also frequently involve the placement of an upper portion of the unit 52 into a lower shallow tray 54, which holds a reservoir of water, in the case of an evaporative cooler. The tray 54 typically is finished around its upper edge with a rolled-over lip 56; so that the lip 56 extends outwardly beyond the plane of the flat sides of the upper unit 52 of the evaporative cooler. In the past, when legs were attached to such units, the legs tipped outwardly, since they were pivoted on the edge of the lip 56. This resulted in less than desirable "footprint" placement of the base portion of a foot member attached to the lower end of such legs.

In order to permit the type of flat engagement of the base portion 20 of the foot member with the roof of the building, while at the same time providing a planar alignment of the upper portion 22 of the foot member with a corresponding side of a leg, the construction of FIGS. 6 through 11 is made. An important element of that construction is a second resilient vibration isolation damper and spacer 40, as illustrated in FIGS. 6, 7 and 8. The damper 40 consists of a generally rectangularly shaped member having extended legs 44 and 46 on opposite sides. At the lower end, a hole 42 is provided to permit the passage of a self-tapping screw 50. A pair of transverse ribs 48 provide structural rigidity. The isolation damper of FIGS. 6, 7 and 8 also is made of rubber-like material of the same type used in the parts 36, 37 and 38 of the embodiment described in conjunction with FIGS. 1 through 5.

The damper 40 is constructed so that the vertical outer edges are at 45° angles to the front surface of the damper 40. This is shown most clearly in FIGS. 8 and 9.

To connect a support leg to the unit 52, a leg having a different configuration from the one shown in FIG. 1 is employed. Instead of the two sides of the leg coming together at a right angle, an intermediate portion 60, oriented 45° to each of the outer portions of the legs 64 and 65, is used, as shown most clearly in FIGS. 9 and 11. To attach the upper portion of the leg to the unit 52, a self-tapping screw 50 is inserted through one of a plurality of evenly spaced holes 63 in the intermediate portion 60. A resilient damper-spacer 40, of the type shown in FIGS. 6 through 8, is placed over the shank of the screw 50, which then is screwed into the wall of the upper unit 52, as illustrated in FIGS. 9 and 10. Two or more damper-spacers 40, located at different vertical positions, are employed to secure the leg to the unit 52 as illustrated. The thickness of the spacers 40 is selected so that the distance by which the spacer holds the leg 60, 64, 65 out from the corner of the unit 52 is sufficient to clear the lip 56 on the lower pan or reservoir portion 54 of the unit, as illustrated in FIG. 10.

By making the damper-spacers 40 out of a resilient rubber-like material, vibration isolation between the unit 52 and the leg 60/64/65 is effected. The leg extends downwardly from the unit. Because of the 45° orientation effected by means of the spacers as shown in FIG. 9, one or the other of the sides 64 and 65 of the leg is located in a perpendicular plane of the pitch of the roof of the building. The foot member comprising the base 20 and the upright portion 22 then is attached to this leg through corresponding holes 68 or 69, in whichever one of the sides 64/65 is properly oriented, in the same manner as described above in conjunction with the embodiment shown in FIGS. 1 through 5. This is illustrated in FIG. 11. Consequently, even though a round-cornered unit with an outwardly-flared lower tray reservoir is employed, the legs 60/64/65 extend in a true vertical alignment with the sides 52 of the air handler unit. Vibration isolation is provided at the foot member, by means of the resilient washers 37 and 38 and the resilient cylinder 36, and, in addition, by the resilient spacers 40. As a consequence, vibration isolation between the unit 52 and the roof is effectively produced by the embodiment of FIGS. 6 through 11, significantly reducing the transmission of vibrational noise from the air handler unit to the interior of the building on which the unit 52 is mounted.

The foregoing description of the preferred embodiment of the invention should be considered as illustrative and not as limiting. Various changes and modifications will occur to those skilled in the art, which perform substantially the same function, in substantially the same way, to achieve substantially the same result, without departing from the true scope of the invention as defined in the appended claims.

I claim:

1. An assembly for leveling a device on a pitched roof, including in combination:

an elongated leg member having first and second ends and first and second perpendicular sides extending the length thereof, said first side of said leg member having a plurality of spaced holes extending along the length thereof, said first and second sides of said leg member being interconnected by an intermediate portion located in a plane at 45° to the planes of each of said first and second sides of said leg member, said intermediate portion also having a plurality of spaced holes extending the length thereof; with said leg member adapted for connection at the first end with a device to be supported thereby on a pitched roof, said first side of said leg member located in a plane of the pitch of the roof;

a foot member having an "L" shaped configuration with mutually perpendicular base and upright portions;

a first vibration isolation damper;

a first attachment member for attaching said upright portion of said foot member with said second end of said first side of said leg member through said vibration isolation damper;

a second attachment member; and a second vibration isolation damper secured between said first end of said elongated leg member and the device to be supported thereby by said second attachment member extending through one of said holes in said intermediate portion of said leg member.

2. The combination according to claim 1 wherein said second attachment member comprises an elongated fastener which extends through a hole in said intermediate portion of said leg member and through said second resilient vibration isolation damper to engage the device to be supported, securing said leg member to the device to be supported through said second resilient vibration isolation damper compressed between said leg and the device to be supported.

3. The combination according to claim 2 wherein said first and second resilient vibration isolation dampers are made of rubber-like material.

4. The combination according to claim 3 wherein said second vibration isolation damper comprises a resilient spacer having a hole therethrough, with said second attachment member passing through said hole in said second resilient vibration isolation damper.

5. The combination according to claim 4 wherein said second vibration isolation damper has a predetermined thickness to cause said elongated leg member to be spaced from the device to be supported by a predetermined amount.

6. An assembly for leveling a device on a pitched roof, including in combination:

an elongated leg member having first and second ends and first and second perpendicular sides extending the length thereof, with said first side of said elongated leg member having a plurality of spaced holes extending the length thereof, and adapted for connection at the first end with a device to be supported thereby on a pitched roof, said first side of said leg member located in a plane of the pitch of the roof;

a foot member having an "L" shaped configuration with mutually perpendicular base and upright portions and having an elongated slot in the upright portion thereof in a plane perpendicular to the base portion thereof;

a first vibration isolation damper extending into said elongated slot;

a bolt extending through said slot, said isolation damper, and a hole in said first side of said leg member near the second end thereof for attaching said upright portion of said foot member with said second end of said first side of said leg member through said vibration isolation damper; and attachment members passing through at least one hole adjacent the first end of said first side of said leg member for connection with the device to be supported thereby.

7. The combination according to claim 6 further including discontinuities in the surface of said upright portion of said foot member adjacent said elongated slot therein, and wherein said first vibration isolation damper has a portion extending beyond said slot to overlie said discontinuities to be pressed against said discontinuities by said first attachment member to secure said foot member against rotational movement relative to said leg member when said first attachment member secures said foot member to said second end of said leg member.

8. An assembly for leveling a device on a pitched roof, including in combination:

an elongated leg member having first and second ends and first and second perpendicular sides extending the length thereof and adapted for connection at the first end with a device to be supported thereby on a pitched roof, said first side of said leg member located in a plane of the pitch of the roof;

a foot member having an "L" shaped configuration with mutually perpendicular base and upright portions;

a first vibration isolation damper;

a first attachment member for attaching said upright portion of said foot member with said second end of said first side of said leg member through said vibration isolation damper; and a second vibration isolation damper, with said second vibration isolation damper secured between said first end of said elongated leg member and the device to be supported thereby.

9. The combination according to claim 8 wherein said second vibration isolation damper has a predetermined thickness to cause said elongated leg member to be spaced from the device to be supported by a predetermined amount.

10. The combination according to claim 9 wherein said first and second resilient vibration isolation dampers are made of rubber-like material.

* * * * *